United States Patent
Choi et al.

(10) Patent No.: US 7,474,703 B2
(45) Date of Patent: *Jan. 6, 2009

(54) DIGITAL TELEVISION SYSTEM

(75) Inventors: In Hwan Choi, Seoul (KR); Young Mo Gu, Seoul (KR); Kyung Won Kang, Seoul (KR); Kook Yeon Kwak, Anyang-si (KR)

(73) Assignee: LG Electronics Inc., Seoul (KR)

( * ) Notice: Subject to any disclaimer, the term of this patent is extended or adjusted under 35 U.S.C. 154(b) by 893 days.

This patent is subject to a terminal disclaimer.

(21) Appl. No.: 10/897,544

(22) Filed: Jul. 23, 2004

(65) Prior Publication Data

US 2005/0041749 A1 Feb. 24, 2005

Related U.S. Application Data

(63) Continuation of application No. 09/962,263, filed on Sep. 26, 2001, now abandoned.

(30) Foreign Application Priority Data

Sep. 26, 2000 (KR) .................... 2000-56473

(51) Int. Cl.
  *H04N 7/12* (2006.01)
  *H03D 1/00* (2006.01)
  *H04J 3/04* (2006.01)
(52) U.S. Cl. .................. 375/240.27; 375/241; 370/535
(58) Field of Classification Search ............ 375/240.27, 375/240.01, 341, 262; 370/535
See application file for complete search history.

(56) References Cited

U.S. PATENT DOCUMENTS

| | | | |
|---|---|---|---|
| 5,087,975 A | 2/1992 | Citta et al. | |
| 5,233,630 A | 8/1993 | Wolf | |
| 5,488,691 A | 1/1996 | Fuoco et al. | |
| 5,555,024 A | 9/1996 | Limberg et al. | |
| 5,563,884 A | 10/1996 | Fimoff et al. | |
| 5,583,889 A | 12/1996 | Citta et al. | |
| 5,600,677 A | 2/1997 | Citta et al. | |
| 5,602,595 A | 2/1997 | Citta et al. | |
| 5,629,958 A | 5/1997 | Wilming | |
| 5,636,251 A | 6/1997 | Citta et al. | |

(Continued)

FOREIGN PATENT DOCUMENTS

KR 2000-0018531 A 4/1997

(Continued)

OTHER PUBLICATIONS

U.S. Appl. No. 60/198,014, Bretl et al.

*Primary Examiner*—Gims S Philippe
(74) *Attorney, Agent, or Firm*—Lee, Hong, Degerman, Kang & Waimey

(57) ABSTRACT

Disclosed is a digital television system carrying out modulation/demodulation by VSB (vestigial side band). A VSB transmitter includes an additional error correction encoder designed in a manner that a signal mapping of a TCM encoder is considered, a multiplexer (MUX), a TCM encoder operating in a manner corresponding to state transition processes of the additional error correction encoder, and a signal transmission part including an RF converter. And, A VSB receiver includes a signal receiver part receiving a signal transmitted from the transmitter, a TCM decoder, a signal processing part including a derandomizer, and an additional error correction decoder part.

18 Claims, 7 Drawing Sheets

U.S. PATENT DOCUMENTS

| | | |
|---|---|---|
| 5,636,252 A | 6/1997 | Patel et al. |
| 5,706,312 A | 1/1998 | Wei |
| 5,831,690 A | 11/1998 | Lyons et al. |
| 5,923,711 A | 7/1999 | Wilming |
| 5,946,047 A | 8/1999 | Levan |
| 6,075,569 A | 6/2000 | Lee et al. |
| 6,178,209 B1 * | 1/2001 | Hulyalkar et al. ........... 375/341 |
| 6,208,643 B1 | 3/2001 | Dieterich et al. |
| 6,490,002 B1 | 12/2002 | Shintani |
| 6,519,298 B1 | 2/2003 | Kim |
| 6,690,738 B1 | 2/2004 | Swenson et al. |
| 6,697,098 B1 | 2/2004 | Wang |
| 6,708,149 B1 | 3/2004 | Turin |
| 6,724,832 B1 | 4/2004 | Hershberger |
| 6,760,077 B2 | 7/2004 | Choi et al. |
| 6,763,025 B2 | 7/2004 | Leatherbury et al. |
| 6,788,710 B1 | 9/2004 | Knutson et al. |
| 6,996,133 B2 * | 2/2006 | Bretl et al. ................... 370/535 |
| 7,215,714 B2 * | 5/2007 | Bretl et al. ................... 375/262 |
| 2002/0085632 A1 | 7/2002 | Choi et al. |
| 2004/0240590 A1 | 12/2004 | Cameron et al. |

FOREIGN PATENT DOCUMENTS

| | | | |
|---|---|---|---|
| KR | 2000-0028757 A | 5/2000 | |

* cited by examiner

DIGITAL TELEVISION SYSTEM

This is a continuation of application Ser. No. 09/962,263 filed Sep. 26, 2001, now abandoned, which application is hereby incorporated by reference in its entirety.

BACKGROUND OF THE INVENTION

1. Field of the Invention

The present invention relates to a digital television system carrying out modulation/demodulation by VSB (vestigial side band).

2. Background of the Related Art

An 8VSB transmission system for terrestrial wave digital broadcasting is taken as a U.S. standard system in 1995 is test-broadcasted from the latter half of the year 1998. Such a test broadcasting using a terrestrial wave digital broadcasting standard based on the U.S. standard system is being carried out in Korea as well.

In such a digital broadcasting system, a transmitted signal is received by a receiver through a terrestrial channel. In order to restore the signal in the receiver despite the noise caused by the channel, the signal is variously coded to be transmitted. In response to the various coding process, the receiver carries out the corresponding decoding process so as to restore the transmitted signal.

Lately, a broadcasting station tries to transfer such a digital broadcasting, which transfers mainly audio and video data, to which various additional data are attached. The additional data includes stock-market information, weather casting, program guide information, HTML, execution files and the like.

FIG. 3 illustrates a structural diagram of a TCM encoder according to a related art.

Referring to FIG. 3, a TCM encoder includes a precoder 1 outputting a first output signal by preceding a first input bit d1 and an encoder outputting a third output signal by encoding a second input bit as a second output signal c1, where a reference numeral '3' indicates a 8VSB mapper.

Meantime, the precoder 1 includes an adder 1a outputting the first output signal c2 by adding the first input bit d1 to a delayed signal and a memory 1b providing the adder 1a with the delayed signal attained by delaying an output signal of the adder 1a.

The TCM encoder according to a related art may cause a fatal damage on the additional data when using it.

Different from general audio/video data in channel transmission, the additional data is vulnerable fatally to an influence of the channel noise. For example, the damaged additional data of which information itself is defected may inform a viewer with wrong information, while the damaged general audio/video data just result in light image/voice loss.

Specifically, when the additional data include numbers or an execution file, a minor data error causes a devastating result of failing the entire operation.

SUMMARY OF THE INVENTION

Accordingly, the present invention is directed to a digital television system that substantially obviates one or more problems due to limitations and disadvantages of the related art.

An object of the present invention is to provide a digital television system fitting for transmitting additional data.

Another object of the present invention is to provide a digital television system robust to a noise.

A further object of the present invention is to provide a digital television system compatible with a conventional digital television system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a VSB transmitter includes an additional error correction encoder carrying out state transition processes on additional data inputted to correct an error and designed for a TCM coding to be considered wherein the TCM coding will be carried out later, a multiplexer multiplexing the additional data and ATSC data wherein the additional and ATSC data are inputted thereto, a TCM encoder operating in a manner corresponding to the state transition processes of the additional error correction encoder and encoding the ATSC and additional data outputted from the multiplexer, and a signal transmission part converting the ATSC and additional data outputted from the TCM encoder into an RF(radio frequency) signal and transmitting the RF signal to a receiver.

In another aspect of the present invention, a VSB receiver includes an RF tuner tuning RF signal transmitted from a VSB transmitter, a VSB demodulator demodulating IF signal outputted from the RF tuner, a TCM decoder decoding the ATSC data and additional data, a deinterleaver deinterleaving soft output of the TCM decoder, a limiter carrying out a hard decision on the soft-outputted ATSC data, an RS decoder decoding the hard-outputted ATSC data, a derandomizer derandomizing the ATSC data having passed through the RS decoder, and an additional error correction decoder part carrying out an error correction on the soft-outputted additional data.

Preferably, the TCM decoder in the VSB receiver is a decoder producing a soft output signal with a soft input signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 4:
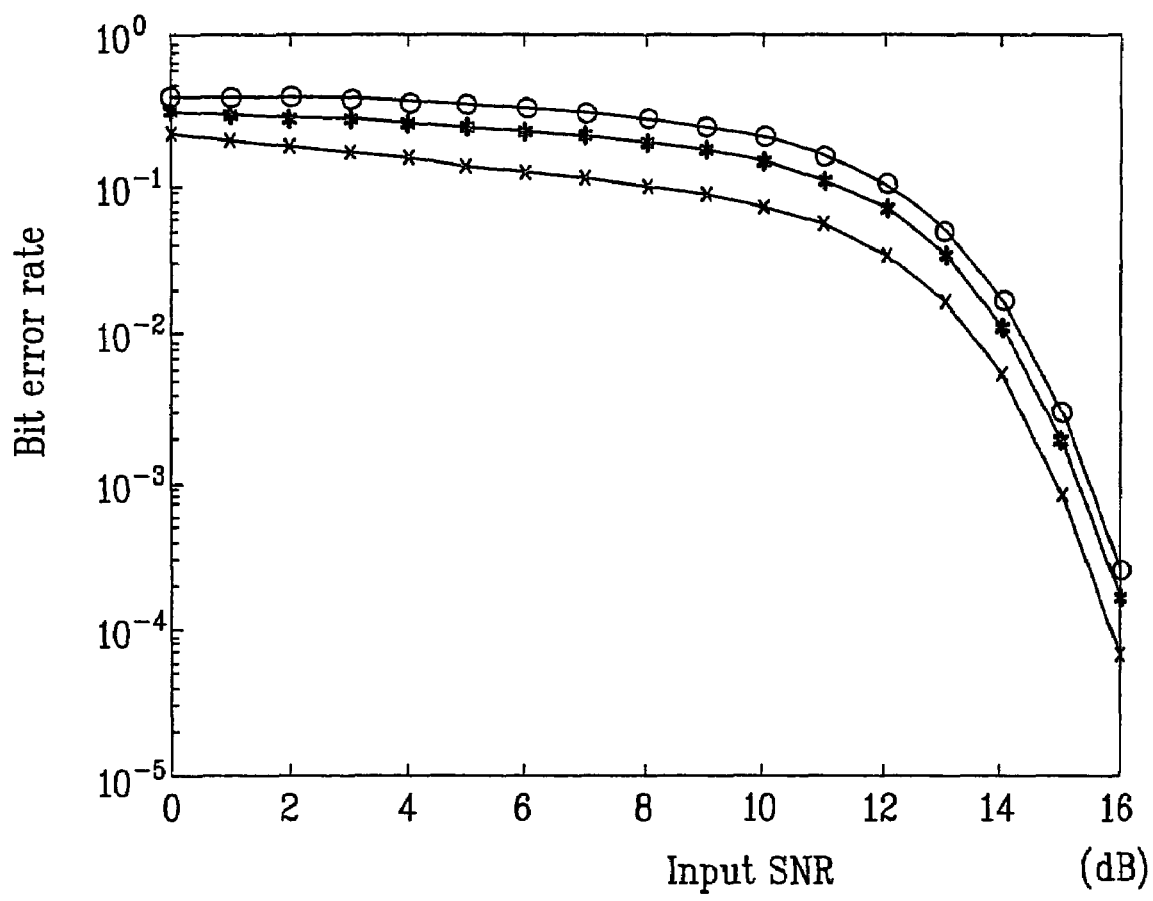
FIG. 4 illustrates a performance graph of a TCM encoder in an 8VSB system on an AWGN (additive white Gaussian noise) channel.

FIG. 4 illustrates a performance graph of a TCM code of an 8VSB system in AWGN(additive white Gaussian noise) channel.

A bit error rate of an uncoded bit d1, another bit error rate of a coded bit d0, and a total bit error rate when regarding the uncoded and coded bits d1 and d0 as one stream are shown in FIG. 4.

Referring to FIG. 4, the bit error rate of the uncoded bit is lower than that of the coded bit. And, the bit error rate of the entire bits corresponds to an average between the respective bit error rates of the uncoded and coded bits. It is because a sub-set is determined by the coded bit, while a signal in the determined sub-set is determined by the uncoded bit.

When a set partitioning of the TCM code, a performance of the uncoded bit determining signals in the sub-set is superior to that of the coded bit since a distance between signals in one sub-set is allotted so as to be longer than that that between signals two different subsets.

In use of such a characteristic, data having a higher significance are inputted using the uncoded bit d1 having a relatively lower bit error rate than the coded bit d0 and another data having a less significance are inputted using the coded bit c0 having a higher bit error rate than the uncoded bit d1. Therefore, it is able to design a more efficient digital television system.

Figure 5:
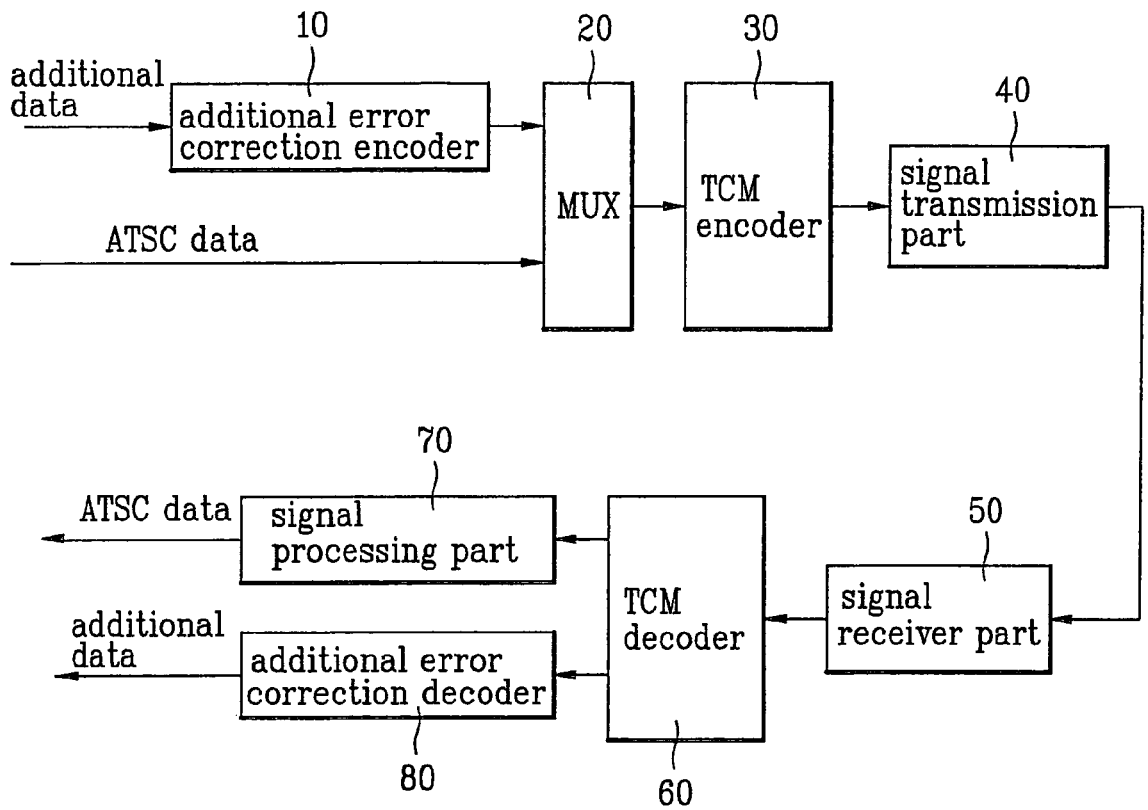
FIG. 5 illustrates a VSB communication system according to the present invention.

FIG. 5 illustrates a VSB communication system according to the present invention.

Referring to FIG. 5, the VSB communication system is divided into a VSB transmitter and a VSB receiver.

The VSB transmitter is constructed with an additional error correction encoder 10 encoding additional data to correct an error thereof additionally and designed in a manner that a signal mapping of a TCM encoder is considered, a multiplexer(MUX) 20 multiplexing an output signal of the additional error correction encoder 10 and inputted ATSC data, a TCM encoder 30 operating in a manner corresponding to state transition processes of the additional error correction encoder 10, and a signal transmission part 40 transmitting an output of the TCM encoder 30 as a radio base to a receiver side.

The VSB receiver is constructed with a signal receiver part 50 receiving a signal transmitted from the signal transmission part 40, i.e. a transmitter side, a TCM decoder 60 decoding a signal outputted from the signal receiver part 50, a signal processing part 70 processing an output signal of the TCM decoder 60, and an additional error correction decoder 80 restoring the additional data by decoding the output signal of the TCM decoder 60 additionally.

The signal processing part 70 is constructed with a limiter limiting the output signal of the TCM decoder 60, an RS decoder decoding an output signal of the limiter, and a derandomizer derandomizing an output signal of the RS decoder.

Figure 6:
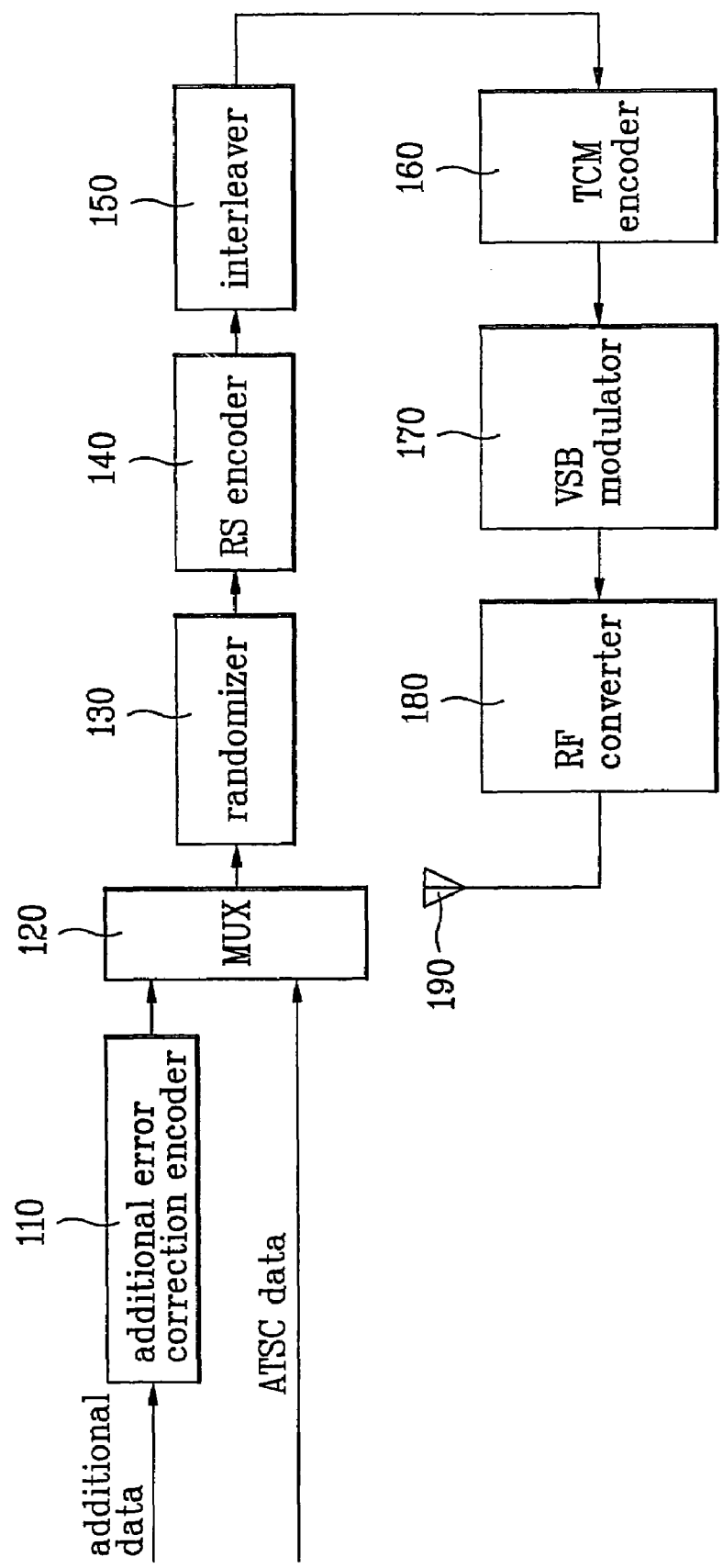
FIG. 6 illustrates a VSB transmitter according to the present invention.

FIG. 6 illustrates a VSB transmitter according to the present invention.

Referring to FIG. 6, a VSB transmitter is constructed with an additional error correction encoder 110 carrying out an encoding for correcting an error additionally on additional data, a multipluxer(MUX) 120 multiplexing the additional data and the general ATSC data failing to pass through the additional error correction encoder 110, a randomizer 130 randomizing an output signal of the multiplexer 120, an RS (reed-solomon) encoder 140 RS-encoding an output signal of the randomizer 130 to add a parity code, an interleaver 150 interleaving an output signal of the RS encoder 140 to protect transmission data from a burst noise possibly occurring on a transmission channel, a TCM encoder 160 encoding an output signal of the interleaver 150 into a TCM code, a VSB modulator 170 VSB-modulating an output signal of the TCM encoder 160, an RF converter 180 converting an output signal of the VSB modulator 170 into an RF signal, and a transmission antenna 190 transmitting the RF signal to a receiver side.

Figure 7:
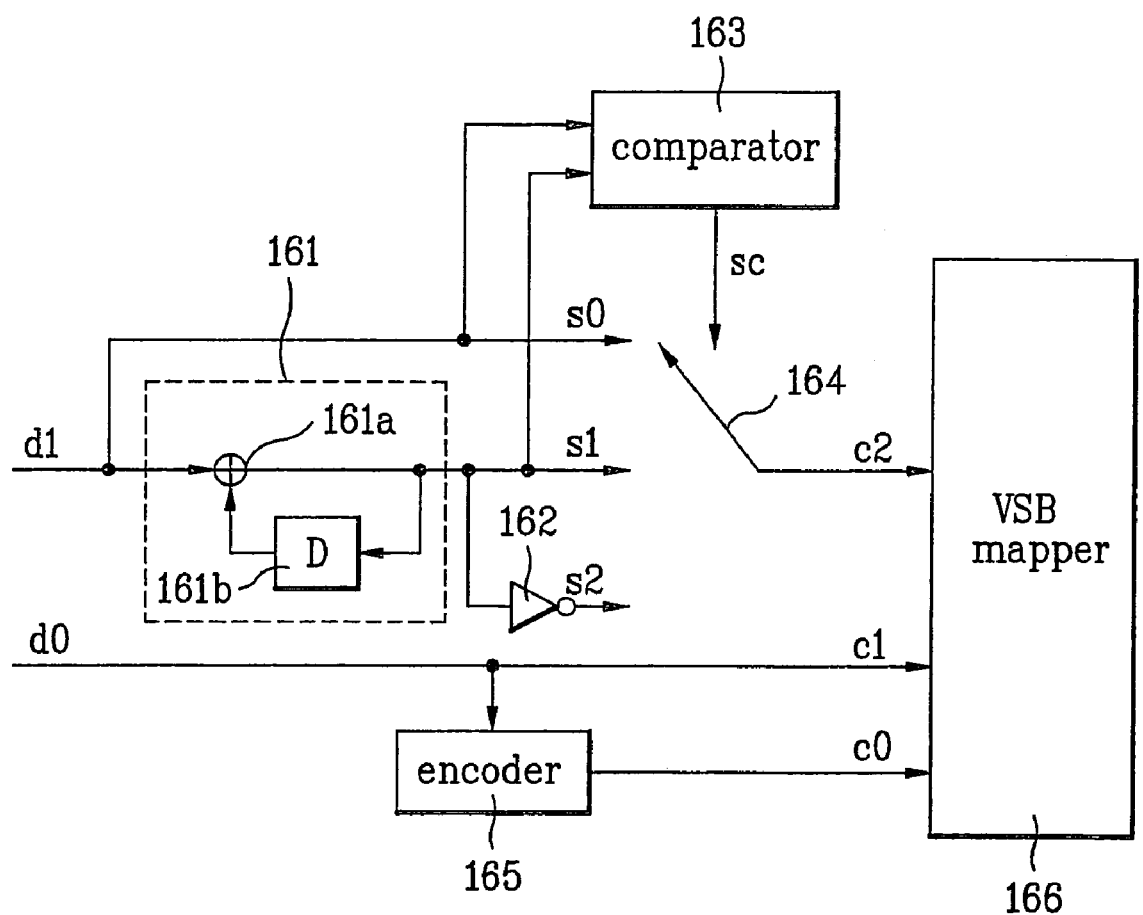
FIG. 7 illustrates a TCM encoder according to the present invention.

FIG. 7 illustrates a detailed construction of the TCM encoder 160 in FIG. 6 according to the present invention, where the TCM encoder 160 is transformed from a conventional precoder.

Referring to FIG. 7, a TCM encoder is constructed with a precoder 161 outputting a second switch input signal s1 by precoding a first input bit d1 as a first switch input signal s0, an inverter 162 outputting a third switch input signal s2 by inverting the second switch input signal s1, a comparator 163 providing a switching control signal by comparing the first and second switch input signals s0 and s1 each other, a switch 164 selectively outputting one of the first to third switch input signals s0 to s2 as a first output signal c2, and an encoder 165 encoding a second input bit d0 as a second output signal c1 so as to output a third output signal c0. And, a reference numeral '166' indicates a VSB mapper.

When the first input bit d1 is additional data, the input bit d1 is output through the switch s0. At this time, the input bit d1 is also input to the precoder 161. When the first input bit d1 is ATSC data, the input bit d1 is divided into two depending on the last bit of the additional data. If the output of the switch s0 at the last bit is equal to the output of the switch s1, an output value of the precoder is output. If not so, an inverse value of the precoder is output.

Meanwhile, the precoder 161 includes an adder 161a outputting the second switch input signal s1 by adding the first input bit d1 and a delayed signal each other and a memory 161b providing the adder 161a with a signal attained by delaying an output signal of the adder 161a for a predetermined time.

The above operations on the first bit d1 is to bypass the precoder in case of additional symbol and maintain compatibility with the related art VSB receiver. The term "compatibility" means that even though the precoder is bypassed in case of additional symbol, the related art VSB receiver can decode ATSC data symbol without error.

The operation of the VSB transmitter is explained in detail as follows.

Different from the general ATSC data, the additional data for additional services such as an execution file, HTML and the like require the additional error correction encoder 110 for preventing a performance degradation caused by the noise.

First, for error correction, the additional data having passed through the additional error correction encoder 110 and the general ATSC data failing to pass through the additional error correction encoder 110 are multiplexed by the multiplexer 120 so that one of the additional and ATSC data is outputted.

Subsequently, the additional or ATSC data passed through the multiplexer 120 enter the randomizer 130.

In this case, the additional data bypasses the randomizer 130, while the ATSC data becomes random through the randomizer 130.

A parity is then added to the additional data and the ATSC data passed through the randomizer 130 in the RS (reed-solomon) encoder 140. And, the additional and ATSC data are interleaved in the interleaver 150 so as to protect the transmission data from the burst noise might occur in the transmission channel.

Then, the additional and ATSC data outputted from the interleaver 150 are encoded again in the TCM encoder 160.

Figure 1:
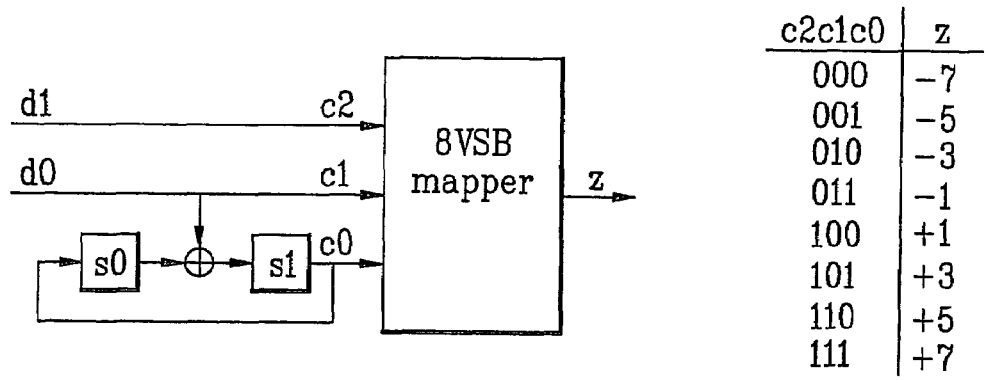
FIG. 1 illustrates a TCM encoder and a signal mapper in an ATSC 8VSB system according to a related art.
Figure 2:
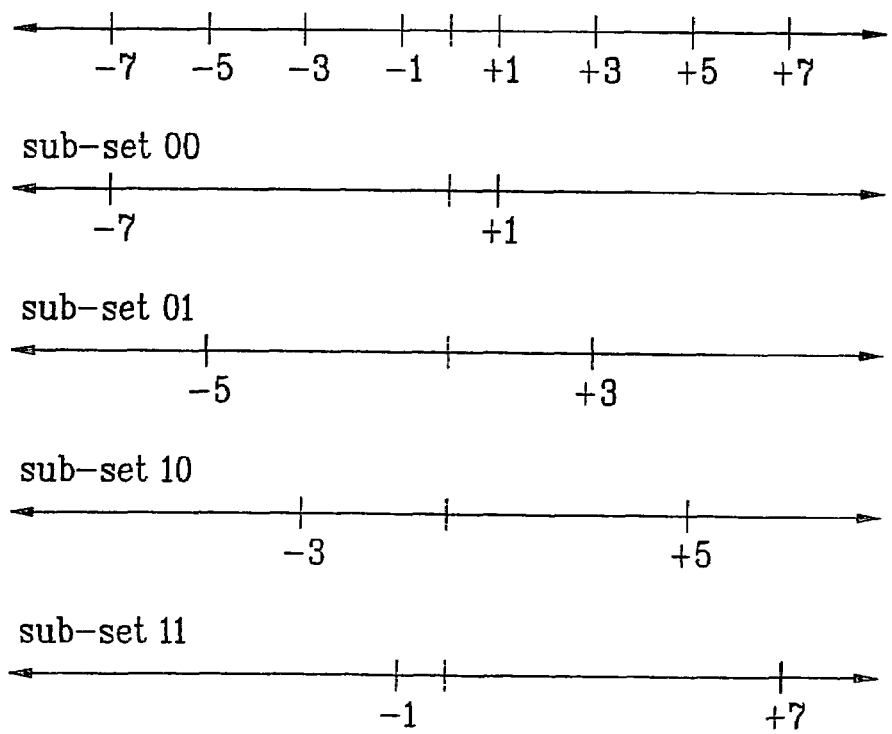
FIG. 2 illustrates a diagram for a set partitioning used in the TCM encoder in FIG. 1.
Figure 3:
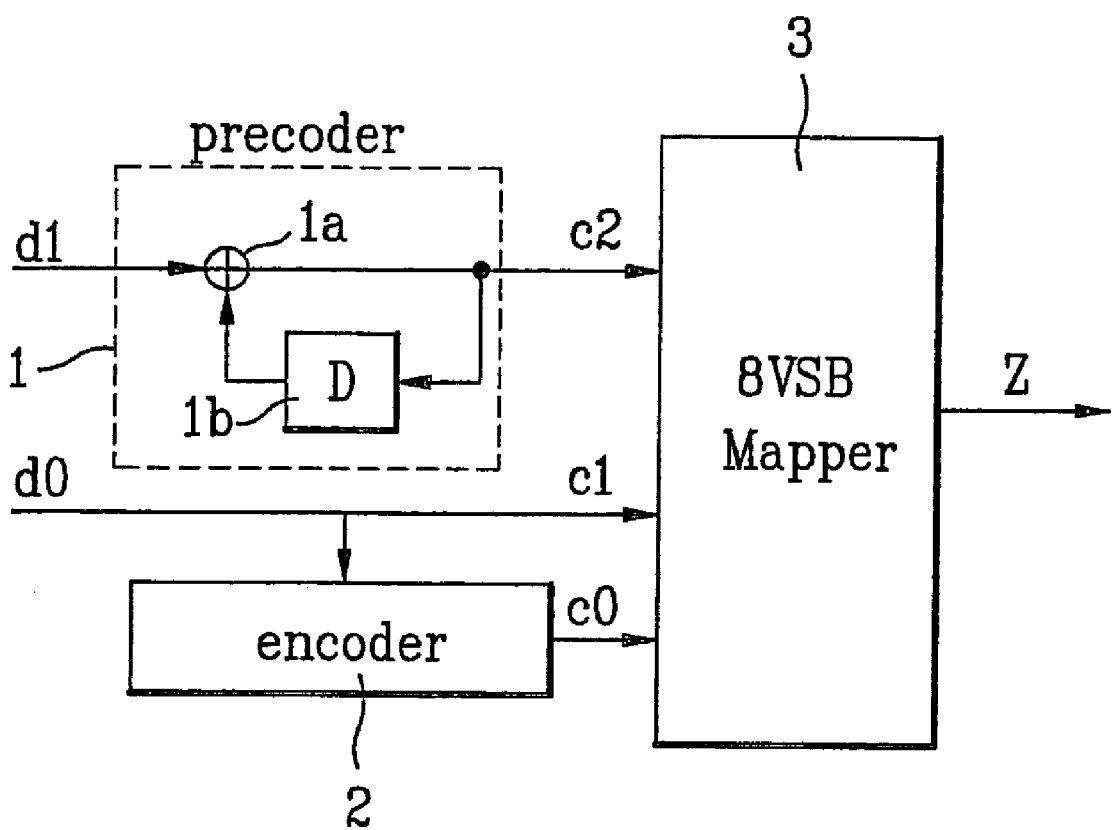
FIG. 3 illustrates a structural diagram of a TCM encoder according to a related art.

As mentioned in the above explanation, the additional and ATSC data passed through the TCM encoder 160 are free from errors even if the additional data are inputted thereto, which is different from the case using the conventional precoder failing to have the switching function in FIG. 3.

For instance, let's assume that a bit 0 is put in the memory 1b of the precoder 161 in FIG. 3 and that a bit stream inputted into the precoder is the following a1.

10110010000101110110001 . . . (a1), where underlines beneath the stream a1 indicates an additional data interval which is additional-error-correction-encoded.

When the additional data interval of the bit stream a1fails to pass through the precoder 161 and the ATSC code interval passes through the precoder 161, the following bit stream a2 is attained.

11011010001101110111001 (a2)

If all of the bit stream a2 pass through a post decoder, an output of the post decoder is represented by the following bit stream a3.

10110111001011010110101 (a3)

In the bit stream a3, a bit 1 denoted by a bold (darkened) numeral of 1 belongs to the previous ATSC data interval, which means that an error occurs. Namely, comparing the input bit stream a1 to the output bit stream a3 of the post decoder, the darkened bit of the output bit stream a3 of the post decoder is changed in the previous ATSC data interval excluding the additional data interval (the underlined bits).

However, after the input bit stream a1 passes through the TCM encoder 160 corresponding to the modified precoder in FIG. 7, the following stream a4 shows up.

11011010001101110111110 (a4)

After all of the bit stream a4 pass through the post decoder, the post decoder outputs the following bit stream a5.

10110111001011010110001 (a5)

Hence, after the input stream a1 having passed through the modified predecoder passes the post decoder, the bit stream a5 outputted from the post decoder becomes equal to the input bit stream a1 in the previous ATSC data interval. Namely, no bit stream error takes place in the previous ATSC data interval.

Figure 8:
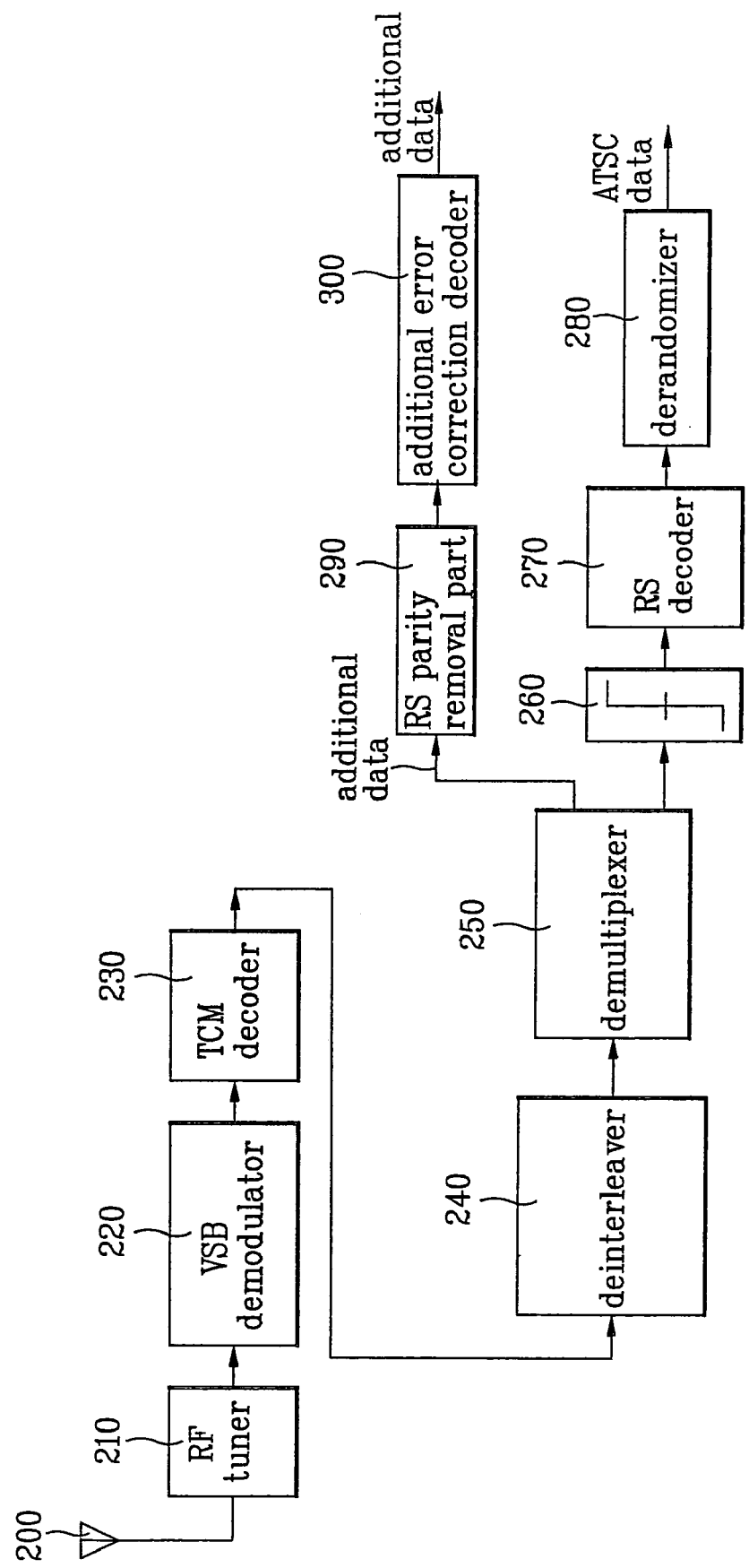
FIG. 8 illustrates a VSB receiver according to the present invention.

FIG. 8 illustrates a diagram of a VSB receiver according to the present invention.

Referring to FIG. 8, the VSB receiver is constructed with an RF (radio frequency) tuner tuning the RF signal received through an antenna 200, a VSB demodulator 220 demodulating IF signal outputted from the RF tuner 210, a TCM decoder 230 decoding an output signal of the VSB demodulator 220 and then providing soft output, a deinterleaver 240 deinterleaving the ATSC and additional data having the soft signal form outputted from the TCM decoder 230, a demultiplexer 250 dividing the data outputted from the deinterleaver 240 into the additional data and the ATSC data and then outputting the divided data, a limiter 260 deciding the ATSC data outputted from the demultiplexer 250, an RS decoder 270 decoding an output signal of the limiter 260, a derandomizer 280 derandomizing an output signal of the RS decoder 270, an RS parity removal part 290 removing a parity from the additional data outputted from the demultiplexer 250, and an additional error correction decoder part 300 decoding an output signal of the RS parity removal part 290 for error correction.

Operation of the VSB receiver is explained as follows.

First, the additional and ATSC data received from the VSB transmitter through the antenna 200 are tuned through the RF tuner 210.

The ATSC and additional data outputted from the RF tuner 220 are demodulated through the VSB demodulator 220. the output signal of the VSB demodulator 220 is decoded by the TCM decoder 230 so as to be outputted as the soft signal form.

At this moment, the TCM decoder 230 should produce a soft output in order to maximize a performance of the additional error correction encoder 110 in the transmitter shown in FIG. 6.

SOVA(soft output viterbi algorithm) and MAP(maximum A posteriori) are algorithms for producing a soft output for a trellis coded data. In aspect of a symbolic error, the MAP algorithm is superior to SOVA.

However, the optimal MAP algorithm has disadvantages such as a calculation of probability in an exponential domain and a presumption of a noise variance of a transmission channel.

Besides, there is SSA (suboptimum soft output algorithm) as a sort of the MAP algorithm, in which a probability is calculated in a logarithmic domain without reducing a performance of the receiver and the presumption of the noise variance is unnecessary.

Therefore, if the SSA algorithm is used as a decoding algorithm, four soft outputs, which are shown in the following calculation formula e1, are produced for the input bits d1 and d0 of the additional error correction encoder 110.

$$L(00) \propto \_Log\, P(d1d0=00|observation)$$

$$L(01) \propto \_Log\, P(d1d0=01|observation)$$

$$L(10) \propto \_Log\, P(d1d0=10|observation)$$

$$L(11) \propto \_Log\, P(d1d0=11|observation) \quad (e1)$$

The soft outputs produced by the SSA decoder are measurements of the probability values for four kinds of combinations of "d1" and "d0" attained after the decoding. Meanwhile, when a convolutional code as an external code is used, these soft outputs are directly used as the branch metric.

Successively, the ATSC and additional data of the soft signal form outputted from the TCM decoder 230 are deinterleaved in the deinterleaver 240.

In this case, the ATSC data, which are outputted from the deinterleaver 240 are made random in the randomizer 130 of the transmitter, come to pass through the derandomizer 280. Besides, as the derandomizer 280 needs a hard signal form, hard decision should be carried out on the ATSC data outputted from the deinterleaver 240 as the soft form.

Yet, the hard decision process is unnecessary for the additional data, which are outputted from the deinterleaver 240 and fail to pass through the derandomizer 280.

Therefore, in order to carry out the hard decision process on the ATSC data outputted from the deinterleaver 240, the ATSC data pass through the limiter 260 and the RS decoder 270 in order and then are inputted to the derandomizer 280.

However, in order to remove the parity added thereto in the transmitter without the hard decision process, the additional data outputted from the deinterleaver 240 pass through the RS parity removal part 290 and then go by way of the additional error correction decoder part 300.

As mentioned in the above description, the digital communication system according to the present invention enables to carry out a data transmission of a high reliance having a signal to noise ratio by adding an additional error correction encoder having a desirable state transition property when used with the mapping of the TCM encoder to an outside of the TCM encoder, thereby enabling to improve a performance of the digital communication system.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A VSB transmitter for transmitting a terrestrial broadcasting signal including main ATSC data and additional data, the VSB transmitter comprising:
   a main processor configured to change input data if it belongs to the main ATSC data, and to bypass the input data if it belongs to the additional data;
   a VSB mapper for mapping the input data outputted from the main processor into a corresponding signal; and
   a data format converter for formatting the signal output from the VSB mapper and transmitting the formatted data to one or more VSB receivers,
   wherein the data format converter comprises:
   a synchronizing multiplexer for multiplexing the signal outputted from the VSB mapper with a field synchronizing signal and segment synchronizing signals,
   a pilot inserter for inserting pilot signals into the multiplexed signal,
   a modulator for modulating the pilot-signals-inserted signal into an intermediate frequency (IF) signal, and
   a Radio Freguency (RF) converter for converting the modulated signal into a Radio Freguency (RF) signal for transmission.

2. The VSB transmitter of claim 1, further comprising a multiplexer for multiplexing the main ATSC data and the additional data, and outputting the multiplexed data to the main processor.

3. The VSB transmitter of claim 1, wherein the main processor comprises:
   a processor for changing a first data bit of the input data and outputting the coded first data bit if it belongs to the main ATSC data, the processor directly outputting the first data bit without changing if it belongs to the additional data; and
   a coder for coding a second data bit of the input data.

4. A VSB transmitter for transmitting a terrestrial broadcasting signal including main ATSC data and additional data, the VSB transmitter comprising
   a multiplexer for multiplexing the main ATSC data and the additional data;
   a processor for changing a first data bit of the multiplexed data and outputting the coded first data bit if it belongs to the main ATSC data, the processor directly outputting the first data bit without changing if it belongs to the additional data;
   a coder for coding a second data bit of the multiplexed data;
   a VSB mapper for mapping the changed or unchanged first data bit output from the processor and the coded second data bit into a corresponding signal; and
   a data format converter for formatting the signal output from the VSB mapper and transmitting the formatted data to one or more VSB receivers,
   wherein the data format converter comprises:
   a synchronizing multiplexer for multiplexing the signal outputted from the VSB mapper with a field synchronizing signal and segment synchronizing signals,
   a pilot inserter for inserting pilot signals into the multiplexed signal,
   a modulator for modulating the pilot-signals-inserted signal into an intermediate freguency (IF) signal, and
   a Radio Freguency (RF) converter for converting the modulated signal into a Radio Freguency (RF) signal for transmission.

5. The VSB transmitter of claim 4, further comprising:
   a data randomizer for randomizing the multiplexed data;
   a Reed-Solomon coder for coding the randomized data; and
   a data interleaver for interleaving the Reed-Solomon coded data.

6. An VSB receiver for receiving and decoding an input signal including main ATSC data and additional data transmitted from a VSB transmitter, the VSB receiver comprising:
   a signal receiver for receiving the input signal including main ATSC data and additional data transmitted from the VSB transmitter;
   a decoder for decoding the main ATSC data and the additional data and generating a soft signal comprising the decoded main ATSC data and the additional data using a SOVA (Soft Output Viterbi Algorithm) or a MAP (Maximum A Posteriori) algorithm; and
   a signal processor for performing a hard decision only on the main ATSC data.

7. The VSB receiver of claim 6, wherein the signal receiver comprises:
   a tuner for tuning to receive the input signal including main ATSC data and additional data transmitted from the VSB transmitter; and
   a demodulator for demodulating the input signal received through the tuner.

8. The VSB receiver of claim 6, wherein the MAP (Maximum A Posteriori) algorithm is SSA (Suboptimum Soft output Algorithm).

9. The VSB receiver of claim 6, wherein the signal processor comprises:
   a limiter for limiting the main ATSC data outputted from the decoder;
   a Reed-Solomon decoder for Reed-Solomon decoding the limited data; and
   a derandomizer for derandomizing the Reed-Solomon decoded data.

10. A digital television (DTV) receiver, comprising:
    a tuner for receiving a DTV signal containing first service data multiplexed with second service data;
    a demodulator for demodulating the DTV signal;
    a TCM decoder for performing trellis decoding on the first and second service data in the demodulated DTV signal for first error correction in order to correct errors in the first and second service data that occurred during reception of the DTV signal, and for outputting the first and second service data as a soft signal;
    a demultiplexer for extracting the trellis-decoded second service data from the soft signal;

a Reed-Solomon (RS) parity remover for removing RS parity data from the extracted second service data; and an additional error correction decoder for decoding the second service data from which parity data has been removed for second error correction in order to additionally correct errors in the second service data that occurred during the reception of the DTV signal.

11. The DTV receiver of claim 10, wherein the first service data comprise ATSC data and the second service data comprise additional data.

12. The DTV receiver of claim 10, wherein the TCM decoder uses one of MAP (Maximum A posteriori Probability) and SOVA (Soft-Out Viterbi Algorithm) in order to output the first and second service data as a soft signal.

13. A method of processing digital broadcast data in a digital television (DTV) receiver, the method comprising:

tuning to a channel to receive a DTV signal containing first service data multiplexed with second service data;

demodulating the DTV signal;

performing trellis decoding on the first and second service data in the demodulated DTV signal for first error correction in order to correct errors in the first and second service data that occurred during reception of the DTV signal;

outputting the first and second service data as a soft signal;

extracting the trellis-decoded second service data from the soft signal;

removing Reed-Solomon (RS) parity data from the extracted second service data; and decoding the second service data from which parity data has been removed for second error correction in order to additionally correct errors in the second service data that occurred during the reception of the DTV signal.

14. The method of claim 13, wherein the first service data comprise ATSC data and the second service data comprise additional data.

15. The method of claim 13, wherein the first and second service data are output as a soft signal using one of MAP (Maximum A posteriori Probability) and SOVA (Soft-Out Viterbi Algorithm) in order to output the first and second service data as a soft signal.

16. A method of processing digital broadcast data in a digital television (DTV) receiver, the method comprising:

tuning to a channel to receive a DTV signal containing first service data multiplexed with second service data;

demodulating the DTV signal;

performing trellis decoding on the first and second service data in the demodulated DTV signal for first error correction in order to correct errors in the first and second service data that occurred during reception of the DTV signal;

outputting the first and second service data as a soft signal;

removing Reed-Solomon (RS) parity data from the second service data in the soft signal; and decoding the second service data from which RS parity data has been removed for second error correction in order to additionally correct errors in the second service data that occurred during the reception of the DTV signal.

17. The method of claim 16, wherein the first service data comprise ATSC data and the second service data comprise additional data.

18. The method of claim 16, wherein the first and second service data are output as a soft signal using either a MAP (Maximum A posteriori Probability) algorithm or a SOVA (Soft-Out Viterbi Algorithm) in order to output the first and second service data as a soft signal.

* * * * *